United States Patent [19]
Kummeke

[11] 3,745,348
[45] July 10, 1973

[54] ELECTRIC DIFFERENTIAL PRESSURE CONVERTER FOR THE CONTROL OF PROBES IN THE DIRECTION OF FLOW

[75] Inventor: Heinrich Kummeke, Dachau-Etzenhausen, Germany

[73] Assignee: Motoren-und Turbinen-Union Munchen GmbH, Munich, Germany

[22] Filed: Apr. 23, 1969

[21] Appl. No.: 818,532

[30] Foreign Application Priority Data
Apr. 26, 1968 Germany............... P 17 73 290.0

[52] U.S. Cl. ................................................. 250/218
[51] Int. Cl. ................................................. G01n 21/26
[58] Field of Search................ 250/218; 356/249, 356/208; 73/401, 402

[56] References Cited
UNITED STATES PATENTS
| | | | |
|---|---|---|---|
| 2,764,178 | 9/1956 | Paul et al. | 250/218 X |
| 3,209,596 | 10/1965 | Kelly | 73/401 |
| 1,955,315 | 4/1934 | Styer | 250/218 |
| 3,204,109 | 8/1965 | Goodwin | 250/219 |

*Primary Examiner*—Walter Stolwein
*Attorney*—Craig and Antonelli

[57] ABSTRACT

A differential pressure converter which includes an essentially U-shaped manometer of which each leg is arranged between a common light source and a photocell while an opaque fluid is used in the manometer.

6 Claims, 1 Drawing Figure

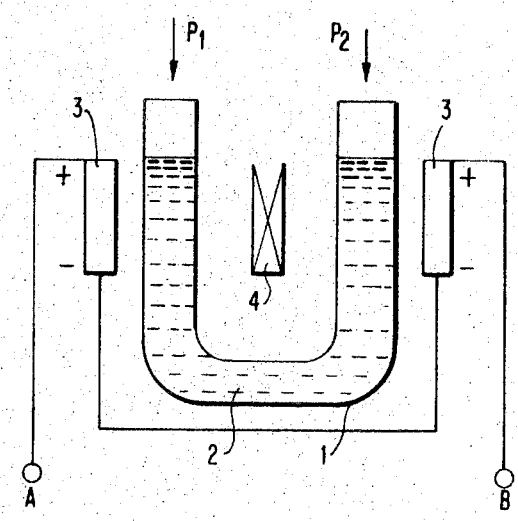

ELECTRIC DIFFERENTIAL PRESSURE CONVERTER FOR THE CONTROL OF PROBES IN THE DIRECTION OF FLOW

The present invention relates to an electric differential pressure converter with a U-tube manometer, in which the level or height of the fluid columns is measured electrically. With known differential pressure converters, the level of a conductive manometer fluid is sensed by means of contact pins. The known devices are rater complicated, since solenoid valves, damping devices, reservoirs or tanks, compensating passages, and relays are required in order to obtain a quasi-steady control behavior.

The present invention aims at eliminating the susceptibility to malfunction inherent in such complicated devices and at producing a straight-forward operationally reliable and very sensitive differential pressure converter of simple construction and possessing a proportional control characteristic.

As solution to the underlying problems, the present invention proposes a differential pressure converter with a U-tube manometer, in which each leg of the U-tube is arranged between a common light source and a photocell and contains an opaque manometer liquid, the density of which corresponds approximately to that of water, the height of the liquid controlling the amount of light from the light source which reaches the photocell, and thus controlling proportionally the terminal voltage of the photocell. A major advantage of this control unit resides in its high sensitivity which is due to the low density of the liquid and to the relatively large variations in the level of the manometer liquid resulting therefrom. Another advantage is that no control elements prone to malfunctioning are arranged between the controlling elements, i.e., between the pressures acting on the two legs of the U-tube manometer and the photocell terminal voltage serving as a control signal.

According to another feature of the present invention, the photocells are to possess a slender or elongated shape in the direction of the fluid columns and are to be arranged in the immediate vicinity of the legs of the U-tubes. The length of the photocells corresponds directly to the proportionality range of the converter. A further advantage resides in the fact that a proportional control characteristic is obtained by simple means, i.e., by increasing or decreasing the exposed area of the photocells as a direct function of the level of the fluid columns.

According to a further feature of the present invention, both photocells are to operate on the differential connection principle, i.e., only the difference of the voltages of the two photocells will appear. This is advantageous in that it eliminates any interfering effects acting uniformly on both legs of the U-tube manometer and thus on the two photocells, such as, for instance, light from an outside source or evaporation of the liquid, thereby preventing any distortion of the control characteristic.

In order to achieve an especially precise metering of the light admitted to the photocells, according to a further feature of the present invention, a mixture of distilled water, drawing ink (India ink) and solvent of any conventional type is used, the transparency of which is almost zero.

Accordingly, it is an object of the present invention to provide an electric differential pressure converter which avoids by simple means the aforementioned shortcomings and drawbacks encountered in the prior art.

Another object of the present invention resides in an electric differential pressure converter which is simple in construction as well as reliable in operation notwithstanding its simplicity.

A further object of the present invention resides in an electric differential pressure converter having high sensitivity as well as excellent proportional control characteristics.

A still further object of the present invention resides in an electric differential pressure converter of the type described above in which the danger of malfunction and breakdown is greatly reduced.

Still another object of the present invention resides in a differential pressure converter which eliminates external influences acting uniformly on the manometer.

These and other objects, features and advantages of the present invention will become more obvious from the following description when taken in connection with the accompanying drawing which shows, for purposes of illustration only, one embodiment in accordance with the present invention, and wherein:

The single FIGURE is a schematic diagram of an electric differential pressure control device in accordance with the present invention.

Referring now to the single FIGURE of the drawing, a light source 4 is arranged between the legs of a U-tube manometer 1 containing a manometer fluid 2, subjected to the two pressures $P_1$ and $P_2$ supplied from a pressure probe, in such a manner that, if pressures $P_1$ and $P_2$ and thus the levels of the two fluid columns are equal, the photocells 3 arranged on the opposite sides of the legs are not exposed to the light. The two photocells 3 are connected in such a manner that the difference of their photoelectric voltages is produced at the terminals A and B.

In case of equality in pressure, the difference between the photo voltages is zero and no control signal is transmitted to the pressure probe. As soon as a pressure differential develops between $P_1$ and $P_2$, one fluid column will drop by the same amount as the other will rise, thus opening the way from the light source to the respective photocell. Due to the elongated shape of the photocells in the direction of the fluid columns, a portion of the photocell corresponding to the respective cleared height of the fluid column will always be illuminated. The photocell of the other manometer leg will not be illuminated due to the rise of the fluid column on that side. The voltage picked off at terminals A and B is transmitted or fed to a measurement transducer which, by way of a conventional actuating mechanism of any known construction, will adjust and equalize pressures $P_1$ and $P_2$ until a differential pressure of zero and thus an equal level or height of the fluid columns and a zero terminal voltage are reached again.

While I have shown and described only one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are within the scope of those skilled in the art.

I claim:

1. A differential pressure converter comprising:
   a U-tube manometer having a pair of legs and a base forming said U-tube;
   a light source disposed between said legs of said manometer;
   an opaque manometer fluid, the density of which is approximately equal to the density of water, substantially filling said U-tube manometer, so as to form a pair of fluid columns, said fluid columns controlling the amount of light from said light source passing through said legs and;
   a pair of photocells, the shapes of which are elongated in the direction of said fluid columns and are arranged to be normally blocked from the light source by said fluid columns, whereby a differential pressure between said legs results in a drop in the height of one of said fluid columns, thereby producing a proportionality increasing voltage in the thus exposed photocell.

2. A differential pressure converter according to claim 1, characterized in that the two photocells operate according to the principle of differential connection.

3. A differential pressure converter according to claim 2, characterized in that a mixture of distilled water, drawing ink, and solvent is used as manometer fluid.

4. A differential pressure converter comprising:
   first means for transmitting light in first and second directions;
   second means displaced with respect to said first means in each of said first and second directions, for generating a differential output signal representative of the difference in the amount of light emitted by said first means and received by said second means in said first and second respective directions;
   third means, disposed between said first and second means, for receiving first and second pressures and for normally preventing the transmission of light emitted by said first means in said first and second directions to said second means in the absence of a pressure differential between said first and second pressures, and for permitting the transmission of light emitted by said first means to said second means in one of said first and second directions only upon the existence of a pressure differential between said first and second pressures, so as to expose at least a portion of said second means in said one of said first and second directions whereby a differential output signal indicative of the pressure differential and proportional to said at least a portion of said second means will be generated by said second means.

5. A converter according to claim 4, wherein said third means comprises:
   a U-tube manometer having a pair of legs, each of which is disposed to intercept light in a respective one of said first and second directions, and a base forming said U-tube;
   an opaque manometer fluid, the density of which is approximately equal to the density of water, substantially filling said U-tube manometer so as to form a pair of fluid columns, said fluid columns controlling the amount of light from said first means passing through said legs;
   said first means comprises a light source disposed between said legs of said manometer; and
   wherein said second means comprises a pair of photocells, the shapes of which are elongated in the direction of said fluid columns and are arranged to be normally blocked by said fluid columns from the light emitted by said light source,
   whereby a differential pressure between said legs results in a drop in the height of one of said fluid columns, thereby producing a proportionally increasing voltage in the thus exposed photocell.

6. A converter according to claim 5, characterized in that a mixture of distilled water, drawing ink and solvent is employed as said manometer fluid.

* * * * *